United States Patent [19]
Bizzoco

[11] 3,740,575
[45] June 19, 1973

[54] IRRIGATION CONTROL SYSTEM TIMING DEVICE FOR CONTROLLING WATERING CYCLE OF A PLURALITY OF WATERING ZONES

[75] Inventor: Michael D. Bizzoco, White Plains, N.Y.

[73] Assignee: Tork Time Controls Inc., Mount Vernon, N.Y.

[22] Filed: June 29, 1971

[21] Appl. No.: 157,867

[52] U.S. Cl. ....... 307/141.4, 200/38 R, 200/38 DA, 307/141.8
[51] Int. Cl. .......................................... H01h 43/16
[58] Field of Search .................... 200/38, 153 LB; 137/624.11, 624.18, 624.19; 307/141, 141.4, 141.8

[56] References Cited
UNITED STATES PATENTS

| | | |
|---|---|---|
| 3,582,582 | 6/1971 | Pauker et al. ...................... 200/38 R |
| 3,440,434 | 4/1969 | Yates et al. ...................... 307/141.4 |
| 3,234,448 | 2/1966 | Link ............................. 307/141.8 X |
| 3,207,866 | 9/1965 | Hicks ............................. 200/38 DB |
| 3,437,767 | 4/1969 | Montgomery .................. 200/38 DA |
| 3,539,878 | 11/1970 | Bell et al. .................... 137/624.18 X |

Primary Examiner—J. R. Scott
Attorney—John F. Ohlandt

[57] ABSTRACT

An irrigation control system which provides a watering cycle for a number of individual watering zones under the control of a timing device, and according to which the time interval assigned to the individual watering zones may be programmed, that is to say, the on and off times for fluid flow in each of the zones may be independently and flexibly varied over the widest possible range.

4 Claims, 6 Drawing Figures

INVENTOR
MICHAEL D. BIZZOCO

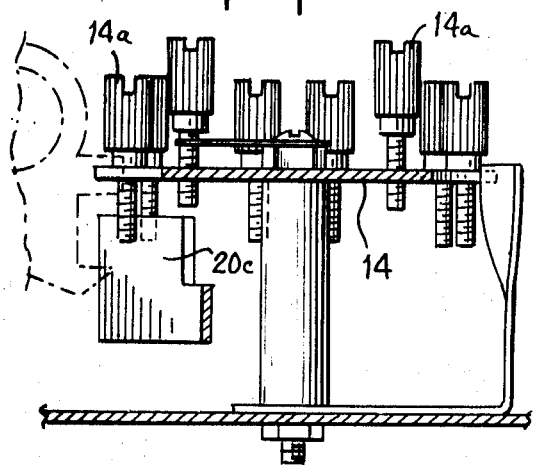
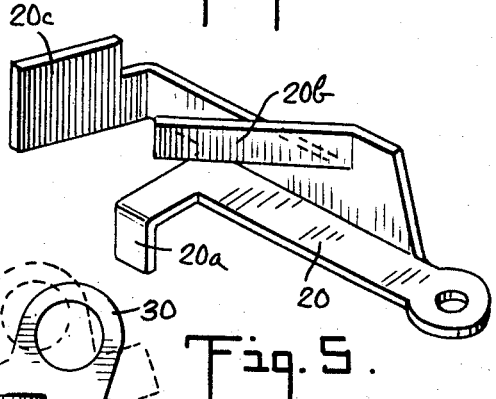
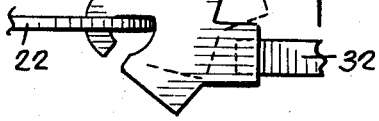
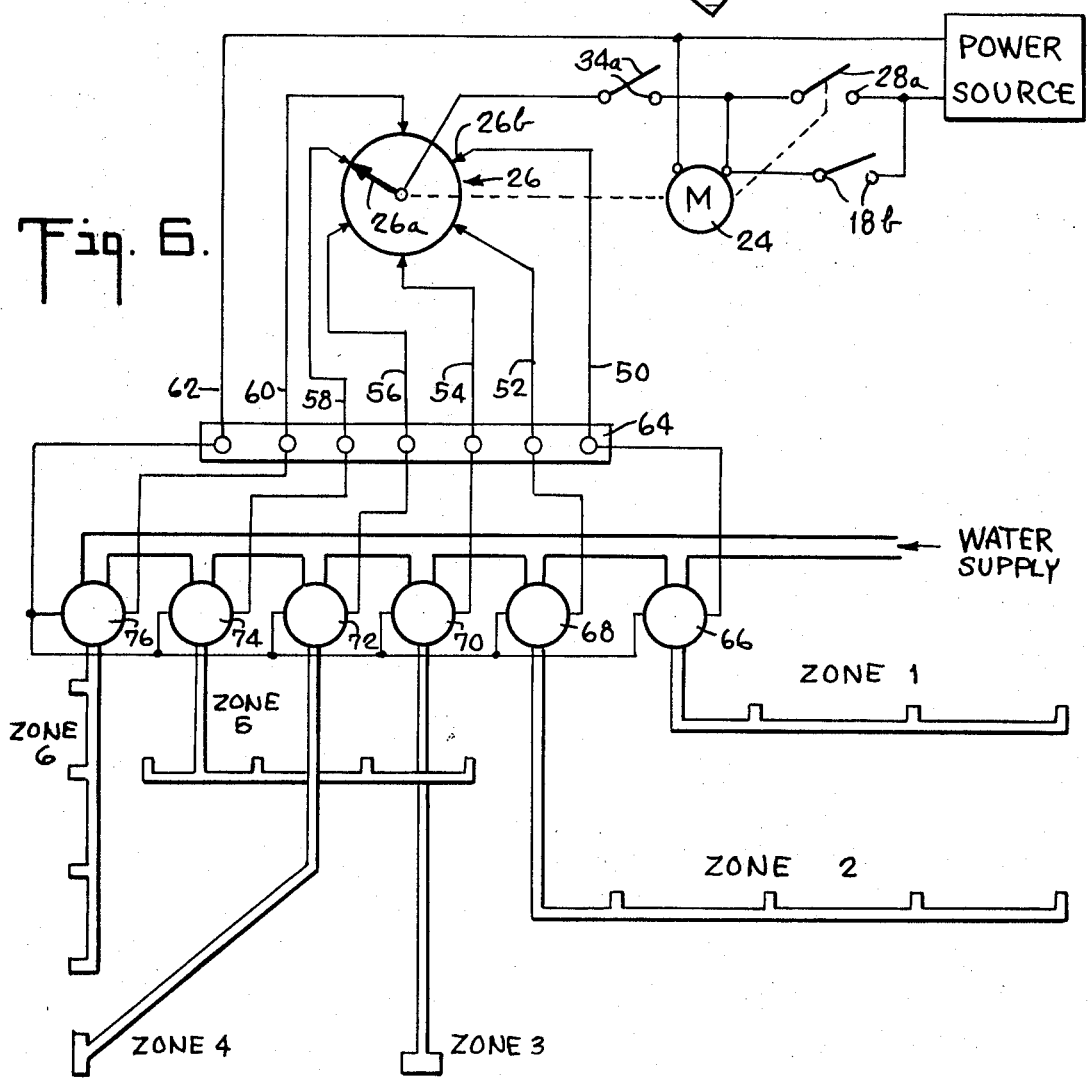

IRRIGATION CONTROL SYSTEM TIMING DEVICE FOR CONTROLLING WATERING CYCLE OF A PLURALITY OF WATERING ZONES

BACKGROUND, OBJECTS AND SUMMARY OF THE INVENTION

This invention relates to an irrigation control system, and more particularly, to a control system including timing devices especially adapted for the automatic control of the irrigation of turf and the like.

A variety of timing devices have been proposed heretofore for the aforenoted purpose of automatic irrigation control. Generally speaking, such timing devices are designed to turn the irrigation apparatus on at such times of the day or week as may be selected by the operator, and to do so automatically day after day. Since great flexibility is required in the irrigation cycle, the control system must be susceptible to being easily adjusted to produce a variety of schedules or programs.

Since most areas to be irrigated, and particularly, home lawns, can not be watered all at one time due to the limitations of the water supply through the main or from the well source, it is usually necessary to water lawns in zones, one zone following another, until all have been watered according to their particular watering schedule.

Thus, an automatic irrigation control system usually contains some sort of clock device that operates on a 24-hour basis and has provisions for selectively eliminating operations on a weekly or bi-weekly schedule. The clock device is coupled either mechanically or electrically to a sequential timer which moves through the watering cycle. Consequently, the several zones are watered sequentially in accordance with the selected schedule in response to the operation of the 24-hour clock device.

Since the water is conveyed through a pipe from the main, or from a suitably designed pump, to the watering head on the lawn, it is necessary to install some kind of shut-off valve to control the flow to each zone. Usually, this is an electric solenoid valve which may be located either remotely from the automatic timing device or close to it, as suits the convenience of the installer. A valve is installed for controlling the water supply to each of the watering zones.

Accordingly, it is required that the automatic timing device for irrigation control function to energize a series of electrical circuits sequentially at a given time on given days and to energize each individual zone according to the program desired by the operator.

It is, therefore, a primary object of the present invention to establish complete flexibility in the scheduling or programming for a desired watering cycle.

In fulfillment of the above-stated object, the irrigation control system of the present invention includes the provision of means for independently varying the fluid flow over the widest possible range within the predetermined or selected time interval assigned to each of the watering zones. The mechanism for so independently varying the fluid flow comprises a cycler switch and a mechanism for actuating the cycler switch comprising a cycler dial and a means, preferably in the form of a plurality of tabs disposed around the periphery of the dial, for selectively engaging an actuator which is operative to control the cycler switch.

Other ancillary objects are fulfilled by the irrigation control system of the present invention by reason of the provision of individual manual switches for controlling the fluid flow to the individual watering zones, whereby any watering zone may be turned OFF without disturbing the automatic sequence settings established by the cycler dial, or whereby any zone may be turned ON without disturbing the automatic sequence for the zones.

An additional switch is also provided in the present system in order that all of the watering zones may be turned OFF simultaneously.

The irrigation control system of the present invention also includes a pump switch which is provided because, quite frequently, normal water supplies are not adequate for proper lawn springkling, and hence, it is required that a special lawn sprinkler pump be installed. It is desirable to have this special pump run only when the control system is calling for water. Consequently, it is arranged that the control system turns on both the appropriate solenoid valve and the well pump motor, and then turns off both devices at the same time. The pump switch also has a manual position, such that the pump can be turned on without disturbing the automatic sequential setting of the irrigation control system. Of course, the pump switch may also be used to operate a master supply electric solonoid valve when water is supplied directly from city main lines.

Other objects, features and advantages of the invention will become apparent from the description herewith set forth in conjunction with the drawings annexed hereto.

BRIEF DESCRIPTION OF THE DRAWINGS:

FIG. 3 is an enlarged sectional view taken along the line 3—3 of FIG. 1, illustrating the control by the omitting wheel associated with the 24-hour dial.

FIG. 4 is a perspective view of the switch actuating mechanism associated with the 24-hour dial.

FIG. 5 is a fragmentary detailed view of the switch actuator associated with the cycler dial.

FIG. 6 is a schematic diagram illustrating the essential elements of the irrigation control system.

Figure 1:
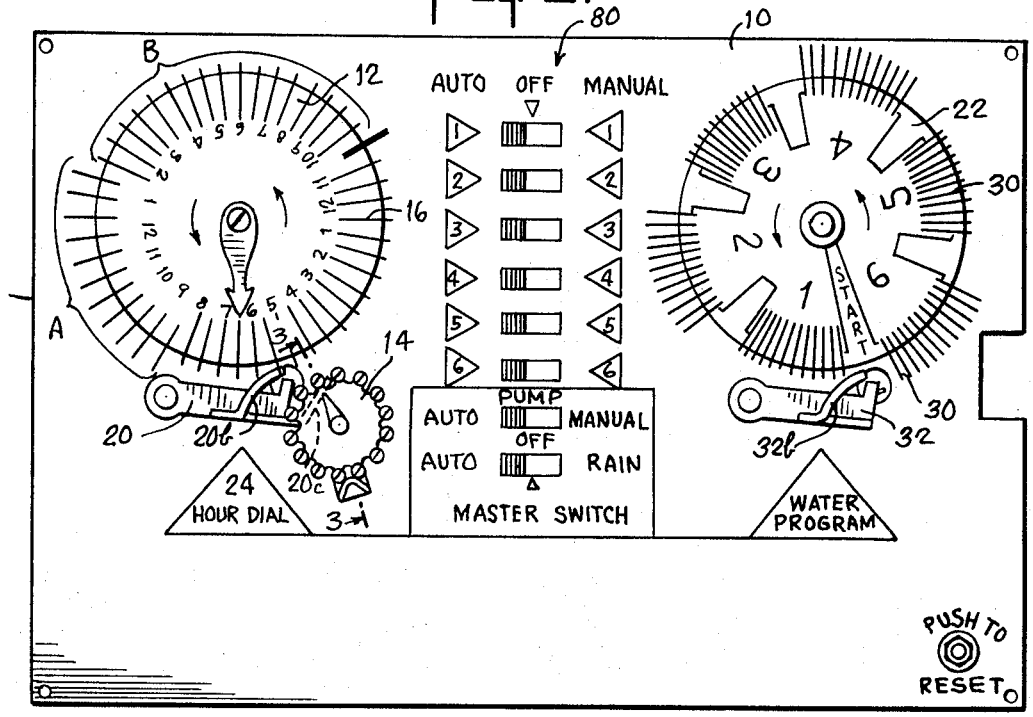
FIG. 1 is a top plan view illustrating the control system panel.
Figure 2:
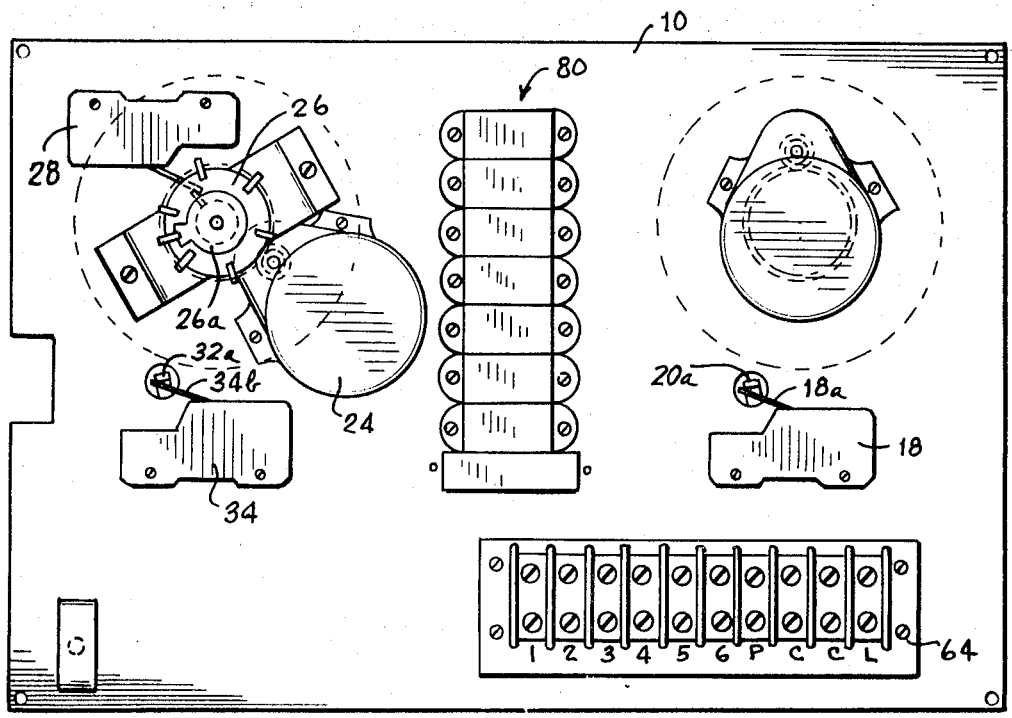
FIG. 2 is a bottom plan view corresponding to the showing of FIG. 1.

DESCRIPTION OF PREFERRED EMBODIMENT:

Referring now to the FIGS., and for the moment to FIG. 1, a panel 10 is seen on which is mounted a 24-hour dial 12. This dial revolves continuously and operates to index ahead, once each day, the 14-day omitting device 14. Disposed around the periphery of the dial 12 are 48 tabs 16. These tabs are not removable from the dial but may be tipped in or out. Some of the tabs, such as the group designated A, are shown in FIG. 1 as being in the "tipped-out" position, and some, such as the group designated B, as being in the "tipped-in" position. When the tabs are in the former position no operation will occur, as will become apparent.

A switch actuator 20 is operatively associated with the dial 12. This switch actuator is designed to include a depending portion 20a, and an arm 20b directed inwardly toward the periphery of the dial 12, and another arm 20c (FIG. 4). Now, assuming one of the tabs 16 is "tipped in", the result will be that the switch actuator 20 will be able to move inwardly, such that the depending portion 20a moves away from the spring-biased toggle 18a of the 24-hour switch 18 producing closure of the contacts 18b of switch 18 (see FIG. 6). Consequently power flow is permitted to the timing motor 24, whereby the cycler dial 22 seen on the right in FIG. 1 starts its operation.

In the event that any omitting screw 14a on the omitting wheel 14, best seen in FIGS. 3, has been placed in its lower position to correspond with a selected day, switch actuator 20 will not be able to move, in the manner described above; therefore switch 18 will then not close and there will be no circuit established to the cycler timing motor 24.

The operation of the cycler dial 22 and the circuit selector switch 26 are controlled by the operation of cycler timing motor 24, whose operation, in turn, is controlled by its own limit switch 28, having contacts 28a, seen in FIG. 6. Thus once the circuit to the timing motor 24 is closed by the operation of the clock dial 12, this motor starts to turn and in a few minutes closes its own limit switch 28, thereby providing an alternate circuit path. Hence, even though the switch 18 may be opened, the cycler dial 22 will continue to rotate for one revolution.

Similarly to the arrangement already described for the clock dial 12, the cycler dial 22 is also provided with a series of tabs 30, which are self-retaining, but may also be tipped in or out. These tabs are operative, in cooperation with the switch actuating mechanism 32, to affect the operation of cycler switch 34, which is provided with contacts 34a. Operation of the cycler switch 34 is dependent on whether the tabs 30 are "tipped in" or "tipped out". The "tipped in" position is shown in dotted lines in FIG. 5, whereby the switch actuator 32 is free to move inwardly, resulting in opening of switch 34.

It will be noted that the tabs 30 are grouped in zones and that the cycler dial 22 is arranged to have a number of zones which may be selected as desired. In the particular embodiment illustrated in FIG. 1, there are 6 zones, but there might be 12, 24, or 36 zones, depending on the size of the dial or the speed with which the dial rotates. It will be understood that the speed of dial 22 might be changed by changing the gearing between timing motor 24 and dial 22.

Permanently attached to dial 22 is the aforementioned selector switch 26, which is designed to have the same number of fixed contact zones as there are zones on the cycler dial 22. The spread of these contact zones on the selector switch conforms precisely to the spread of the 6 zones on the cycler dial 22. It will be appreciated, by reference to FIG. 6, that electrical power from the power source is fed, once the switch contacts 28a and 34a are closed, to the movable contact 26a of the selector switch 26. Then, individual circuits are selectively established by way of the individual fixed contacts 26b, the respective conductors 50-60, and the terminal strip 64, to the respective electric solenoid valves 66—76. The common return is by the line 62.

As described briefly heretofore, a series of manual switches 80 are provided on the control panel 10. These are not illustrated in the schematic diagram of FIG. 6, but it will be appreciated by those skilled in the art that the switch positions for each of the six zones are so constituted that they enable turning off power without disturbing the pre-selection made on the cycler dial; they also enable turning on power when desired without disturbing the automatic sequence.

The two lowermost switches which may be seen in FIG. 1 are the pump switch, whose purpose has already been described, and the master switch which functions to turn all sections off at once. This master switch has a position known as the "rain" position. This position permits turning off flow to all watering zones in case it starts to rain during the watering cycle, but then permits the cycler dial 22 to return to its "home" position so that it will be ready to start the next cycle when so desired by the operator, after the master switch has been returned to its normal position.

Returning to the operation of the cycler dial 22, it will be apparent that as the cycler dial rotates through the full 360°, the various segments or zones of the selector switch 26 are contacted in sequence, and as a result, the respective electric solenoid valves 66–76 are energized, thereby to permit fluid flow to the particular watering zone.

The present invention, in its principal aspects, is concerned with the provision of control means for independently varying the fluid flow within the predetermined time interval assigned to each of the plurality of zones, and specifically, in establishing control over the opening and closing of the electrical circuit to the selector switch, such that the zone valve controlling the fluid flow to each zone may be repeatedly turned on and off within the predetermined time interval.

The above-noted features are implemented in the embodiment illustrated by the capability of adjusting the tabs 30 which are grouped into the zones aforedescribed. Thus, any one or more of the tabs 30 in a given zone on the cycler dial 22 can be "tipped out", such that that portion will correspond to a time period during which there will be energization of the partucular zone valve. This is so because any "tipped out" tab forces the switch actuator 32 to move outwardly into engagement with the toggle 34b of the cycler switch 34, thereby enabling closure of switch contacts 34a of this normally open switch.

On the other hand, when the tabs 30 in any given zone on the cycler zone 22 are "tipped in" there will be de-energization of the particular zone valve because the contacts 34a will be open.

The particular feature of being able to turn a zone valve on and off repeatedly during the assigned time interval for the zone is very important because it permits watering for short periods, thereby giving the water an opportunity to soak in, rather than continuous watering, which would result in run-off if the surface is not prepared to receive the water.

The length of time that each of the tabs 30, on the dial 22, will cause the circuit of the particular zone valve to be energized, varies with the speed at which the dial turns, and the size of the particular dial. Dial zones may vary within certain mechanical limits, ranging from approximately 4 inches to possibly 10 or 12 inches in diameter, while the dial speed may vary from a revolution in 1 hour to 1 revolution in 12 hours.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:
1. An irrigation control system comprising:
A. a plurality of electrical means for controlling fluid flow to a respective plurality of irrigation zones;
B. a plurality of electrical branch circuits each of which is connected to a fluid flow control means for a respective zone;
C. an automatic timing device for selectively energizing each of said fluid flow control means in accordance with a pre-selected program, including
 1. motor,
 2. a rotatable dial with positionally displaceable means thereon and having zones corresponding to the irrigation zones, said dial being controlled by the operation of said motor so as to assign equal predetermined time intervals of the program cycle to each of the dial zones;
 3. a selector switch, having contact zones corresponding to said dial zones, said selector switch being controlled by the operation of said motor for sequentially rendering each of said electrical branch circuits capable of energization for said equal predetermined time intervals;
 4. and means for independently varying the fluid flow within a particular predetermined time interval assigned to each of said dial zones, said means comprising
  a. another switch, and
  b. an actuator for said switch, said actuator being responsive to the positionally displaceable means on said dial for repeatedly effecting, within said predetermined time interval, alternate On and Off states for the fluid flow control means associated with a respective zone by controlling the energization of the corresponding one of said electrical branch circuits, said alternate On and Off states having a minimum time period equal to a unit sub-interval of said predetermined time interval.

2. A system as defined in claim 1, in which said positionally displaceable means includes a plurality of radially displaceable tabs disposed around the periphery of said dial for selectively engaging said actuator,
the time period for engagement of said actuator by each of said tabs corresponding substantially with a unit sub-interval of said predetermined time interval.

3. A system as defined in claim 2, in which
said tabs are tilted radially inwardly or outwardly so as to affect the operation of said other switch.

4. A system as defined in claim 1, further comprising
another dial and means for providing continuous movement of said other dial;
a third switch adapted to be actuated by said other dial;
and further including means for activating said motor for moving said first recited dial responsive to closure of said third switch.

* * * * *